June 8, 1965 H. B. LEWIS, JR 3,188,576

TEMPERATURE COMPENSATION FOR D.C. AMPLIFIERS

Filed Feb. 16, 1962

INVENTOR.
HOWARD B. LEWIS, JR.

BY

ATTORNEYS.

United States Patent Office 3,188,576
Patented June 8, 1965

3,188,576
TEMPERATURE COMPENSATION FOR D.C. AMPLIFIERS

Howard B. Lewis, Jr., Reading, Mass., assignor to Consolidated Electrodynamics Corporation, Pasadena, Calif., a corporation of California Filed Feb. 16, 1962, Ser. No. 173,732
5 Claims. (Cl. 330—23)

Figure 2:
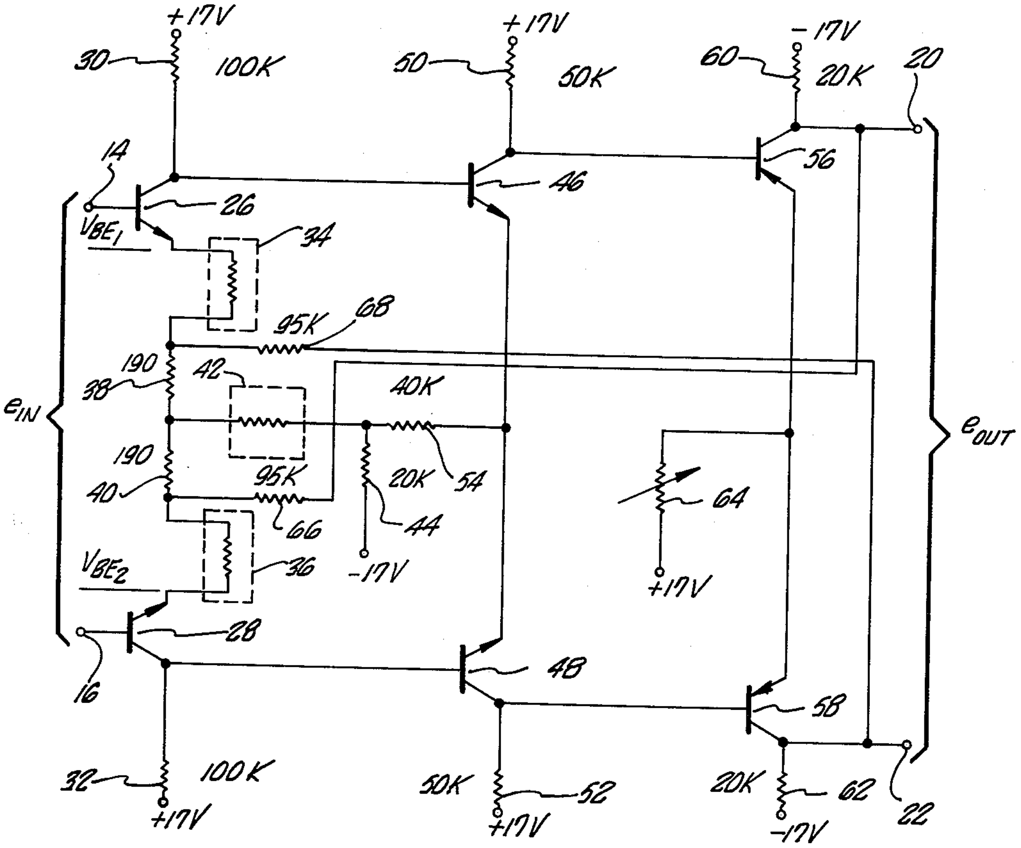

The present invention relates to direct coupled amplifiers, and, more particularly, to a transistorized differential amplifier compensated for drift resulting from temperature changes.

Transducers for converting changes in temperature, pressure, mechanical strains, or the like, to an electrical signal are well known. If the transducer is in the form of a resistance which varies according to some measured condition, the resistor may be connected as the arm in a bridge and a D.C. potential produced across one diagonal of the bridge which varies according to changes in the resistance of the transducer.

Frequently the magnitude of potential changes which are being measured are quite small and the power available to drive some indicating means such as a galvanometer or other voltage sensitive device may be extremely small. For this reason, it may be necessary to provide some voltage as well as power amplification between the transducer and the indicating device. Because D.C. or very low frequency signals are involved, direct coupled amplifiers are required, unless some modulation and demodulation scheme is used in combination with an A.C. coupled amplifier. The latter technique, while avoiding certain problems inherent in direct coupled amplifiers, is complicated and costly, and introduces special problems of its own. Therefore, it is preferable to use direct coupled amplifiers. However, direct coupled amplifiers are inherently subject to drift due to changes of the characteristics of the circuit components with age and variations in temperature or changes in other ambient conditions.

Where signals applied to a direct coupled amplifier are derived from a bridge circuit, the output may be floating with respect to ground, and therefore a differential amplifier having a double-ended input is generally used. The differential amplifier has the advantage that it utilizes two tubes or two transistors per stage, so that any change in the operating characteristic of one element may be balanced out by a similar change in the operating characteristic of the other. Also changes in the potential source are balanced out in such an arrangement. Thus if perfectly matched components are available and they remain matched over the temperature range of interest, the differential amplifier remains balanced and no compensation is required.

The use of transistors in D.C. amplifiers has eliminated much of the long term drift problems associated with D.C. amplifiers using vacuum tubes, which are subject to changes in the emission characteristics of the heated cathode. However, transistors are sensitive to changes in ambient temperature and therefore present short term drift problems. For this reason, sensitive high gain D.C. amplifiers utilizing transistors often are placed in an oven or similar thermostatically controlled environment so that the temperature may be held substantially uniform.

The present invention provides an improved direct coupled differential amplifier which is substantially free from drift over a wide range of ambient temperature conditions. The temperature compensation technique of the present invention is not expensive or complicated and does not in itself introduce any additional errors in the circuit operation. The need for an oven or other means for providing controlled environmental conditions is avoided, thus eliminating the expense and bulkiness attendant in arrangemets which seek to produce drift free operation by controlling the environment. Furthermore, perfectly matched components are not required, one of the basic advantages of the present invention being to permit selection of relatively imperfectly matched components.

In brief, the present invention contemplates a differential amplifier using transistors in which the input stage utilizes a pair of transistors in a push-pull configuration with the transistors arranged in a common emitter type circuit. In addition to feedback resistors which may be connected between the emitters of the input transistors, a pair of temperature compensating resistors are provided according to the teaching of the present invention. One of these resistors is selected to have a substantially constant resistance over the operating temperature range of the circuit and the other resistors has a predetermined temperature change over the resistance operating range of the amplifier circuit. The value of these resistors is selected by the method hereinafter described in detail, such that the input transistor stage remains balanced over the full operating temperature range.

Figure 1:
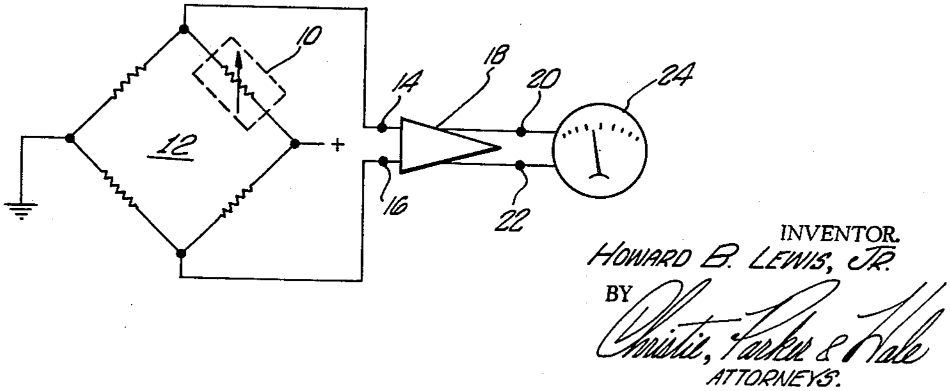

For a more complete understanding of the invention, reference should be made to the accompanying drawing, wherein:

FIGURE 1 is a schematic representation of a typical application of the amplifier circuit of the present invention; and FIGURE 2 is a schematic diagram of the amplifier circuit.

Referring to FIGURE 1 in detail, the numeral 10 indicates generally a transducer element which has a resistance or impedance that varies in some known relationship in response to some input stimulus such as a temperature variation, a pressure variation, a mechanical strain or the like. The transducer element 10 is connected as one arm of a bridge circuit 12. A potential, one side of which may be grounded, is connected across one diagonal of the bridge 12. The other diagonal of the bridge 12 is connected to the input terminals 14 and 16 of a direct coupled amplifier 18 of the type described below in connection with FIGURE 2. The amplifier 18 provides an amplified signal across a pair of output terminals 20 and 22. The amplifier output signal is applied to a galvanometer or other suitable indicating means, such as indicated at 24.

The direct coupled amplifier 18 is normally adjusted such that when a zero input voltage is derived across the diagonal of the bridge 12, a zero output voltage is provided across the output terminals 20 and 22. If the amplifier 18 were a single-ended amplifier, any slight change in the gain of any one stage, particularly the input stage, with changes in supply potential or changes in transistor characteristics with temperatures would result in a change in the voltage across the output terminals even though the voltage across the input terminals remained the same. A double-ended or differential amplifier has the advantage that it provides a symmetrical configuration in which changes in the operating characteristics of one transistor are partially nullified or balanced out by corresponding changes in the other transistor of the same stage. However, unless the components are perfectly matched over the full temperature range of interest, the differential amplifier does not remain balanced and changes may result in the output voltage which are not directly related to changes in the input voltage.

Referring to FIGURE 2 in detail, a schematic diagram of a direct coupled differential amplifier is shown which includes preferably three stages of amplification. The input stage includes a pair of NPN transistors 26 and 28. These transistors are connected in a common emitter circuit with the base electrodes being connected respectively to the input terminals 14 and 16. The collector electrodes are connected to a positive potential source through the respective load resistors 30 and 32. Connected in series between the emitter terminals are a pair of temperature compensating resistor elements 34 and 36 and a pair of feedback resistors 38 and 40. The junction between the feedback resistors 38 and 40 is connected to the negative side of a potential source through a thermistor element 42 and a bias resistor 44. The thermistor element 42 provides a substantially constant current source for the transistors 26 and 28 over the temperature operating range of the circuit. Thus the thermistor 42 operates to maintain the proper bias conditions on the transistors 26 and 28 thereby maintaining the transistors at the proper operating point over a wide temperature range. The use of a thermistor or similar constant current control device is well known corresponding to the element 42 and forms no part of the present invention.

The second stage includes a similar pair of NPN transistors 46 and 48 also connected in a common emitter configuration. The base electrode of the transistor 46 is directly connected to the collector electrode of the transistor 26. Similarly the base electrode of the transistor 48 is directly connected to the collector electrode of the transistor 28. The collector electrodes of the transistors 46 and 48 are connected respectively through the load resistors 50 and 52 to the positive side of the potential source. The emitter electrodes are connected together to the negative side of the potential source through a resistor 54 and the resistor 44.

The output stage preferably includes two PNP transistors 56 and 58 having their base electrodes directly connected to the respective collector electrodes of the transistors 46 and 48. The collector electrodes are connected to the negative side of a potential source through respective load resistors 60 and 62, the emitter electrodes being connected to the positive side of the potential source through a common bias resistor 64. The collector electrodes of the transistors 56 and 58 are directly connected to the output terminals 20 and 22.

A negative feedback signal is derived from the collector of the output transistor 56 and is connected through a series resistor 66 to the junction point between the feedback resistor 40 and the temperature compensation element 36. Similarly a negative feedback signal is derived from the collector electrode of the output transistor 58 and connected through a series resistor 68 to the junction between the feedback resistor 38 and the temperature compensation element 34 in the emitter circuit of the input stage. Typical values for the circuit elements are given by way of example in connection with FIGURE 2. The negative feedback operates in conventional fashion to provide an effectively high input impedance and to compensate for changes in the gain with changes in the parameters of the transistors. The feedback is not essential to the temperature compensation feature of the present invention.

In the absence of the temperature compensation elements 34 and 36, the circuit operates as a typical differential amplifier circuit. If the transistors in each stage were perfectly matched in their charcateristics over the operating temperature range of the amplifier, the amplifier would remain balanced and there would be no drift in the output signal. The thermistor 42 automatically corrects for any change in the effective operating point of the input transistors 26 and 28 with temperature change. However, if the characteristics of the transistors 26 and 28 are not perfectly matched, a change in output signal between the output terminals 20 and 22 may result from changes in ambient temperature. The input stages of course are most sensitive, since any change in the input stage is magnified by the subsequent gain of the second and third stages.

The problem with which the present invention is concerned is the variation of the output voltage $e_{out}$ between the output terminals 20 and 22 as a function of temperature even when the input signal $e_{in}$ remains unchanged. At any given temperature, the circuit can be readily adjusted such that $e_{out}$ will be zero when $e_{in}$ is zero. However, over large temperature changes $e_{out}$ may not remain zero since the characteristics of the transistors 26 and 28 change with temperature and the changes are not identical. The base-to-emitter voltage, designated $V_{BE}$, for each of the transistors, changes substantially with temperature and the temperature coefficient is different for each transistor. Any difference in the base-to-emitter potential $V_{BE}$ for the two input transistors has the same effect as an input voltage. Moreover, the difference between these two voltages is not constant with changes in temperature and therefore temperature changes have the effect of acting like changes in the input voltage $e_{in}$, resulting in an amplified change in the output voltage $e_{out}$.

The present invention provides a means for compensating for the variations in the difference between the base-to-emitter voltages of the input transistors 26 and 28. This compensation is effected by the insertion of the compensation resistance elements 34 and 36, the values of which are determined in the following manner.

First consider the input terminals 14 and 16 as shorted together and the compensation elements 34 and 36 shorted out. The change in the output voltage $e_{out}$ is then measured over the operating temperature range, for example, from 0° C. to 100° C. Unless the transistors 26 and 28 are prefectly matched over their temperature range, $e_{out}$ will vary. The change in output voltage over the temperature range, divided by the gain of the amplifier provides a measure of the variation in the difference between the base-to-emitter voltages. This may be expressed as $$\Delta(V_{BE_1}-V_{BE_2})=\frac{\Delta e_{out}}{A}$$

If the bias on the emitter of one or the other or both of the input transistors is changed, the output voltage $e_{out}$ can be changed. The bias voltage need only be changed by the same amount as the change in the difference between the base-to-emitter voltages of the two input transistors. Bias can be introduced by a resistor in the emitter circuit, the bias voltage being developed in response to emitter current. Therefore by changing an emitter bias resistance by an amount ΔR over the temperature operating range, such that $$\Delta R=\frac{\Delta(V_{BE_1}-V_{BE_2})}{i_{emitter}}$$

the output voltage can be held constant over the full temperature range.

Since the base current is quite small, for the purpose of understanding the present invention, the emitter current may be considered as substantially equal to the collector current. Thus the value of the current is best calculated by knowing the value of the resistors 30 or 32 and measuring the voltage drop across these resistors. The above expression for ΔR provides that if the emitter resistance is changed by an amount ΔR over the operating temperature range, the output voltage $e_{out}$ remains unchanged over the temperature range.

According to the present invention, the change in resistance ΔR is introduced by one or the other or both of the temperature compensating elements 34 and 36. Generally, it is more convenient to have only one of the two elements vary with temperature and make the other element of a material which has a constant resistance over the operating temperature range. For example, one element may be made of manganin or evanohm and the other element may be made from platinum wire which has a positive temperature coefficient. In this event, if the output terminal 20 goes positive with respect to the output terminal 22 as the temperature is increased, the element 34 would be made of constant resistance material and the element 36 would be made of a material having a positive temperature coefficient. Using a material of known temperature coefficient, such as platinum wire, the nominal resistance of the temperature compensation element can be readily calculated by dividing the required change in resistance per degree change in temperature by the temperature coefficient of the resistance material being used. The resistance of the other compensation element is made of material having a zero temperature coefficient and the value of the resistance is made equal to the nominal resistance of the temperature sensitive resistance element. In this way, the differential is maintained symmetrical and balanced over the full operating range.

What is claimed is:

1. A balanced amplifier stage comprising a pair of transistors each having an emitter, a collector, and a base electrode, a pair of input terminals connected respectively to the two base electrodes, a pair of output terminals connected respectively to the two collector electrodes, a potential source, a pair of load resistors connected respectively between one terminal of the potential source and the two collector electrodes, and means including first and second resistors connecting respectively the two emitters to the other terminal of the potential source, said first resistor having a substantially zero temperature coefficient and the second resistor having a relatively large substantially constant temperature coefficient, the second resistor providing a change in resistance ΔR over a predetermined operating temperature range defined by the relation $$\Delta R = \frac{\Delta(V_{BE_1} - V_{BE_2})}{i_e}$$

where $\Delta(V_{BE_1} - V_{BE_2})$ is the change in the difference between the base-emitter voltages of the two transistors over the operating temperature range and $i_e$ is the quiescent emitter current in the transistor associated with the second resistor.

2. A balanced amplifier stage comprising a pair of transistors each having an emitter, a collector, and a base electrode, a potential source, a pair of load impedances connected respectively between one terminal of the potential source and the two collector electrodes, and means including first and second resistors connecting respectively the two emitters to the other terminal of the potential source, one of said first and second resistors providing a change in resistance ΔR over a predetermined operating temperature range defined by the relation $$\Delta R = \frac{\Delta(V_{BE_1} - V_{BE_2})}{i_e}$$

where $\Delta(V_{BE_1} - V_{BE_2})$ is the change in the difference between the base-emitter voltages of the two transistors over the operating tempearture range and $i_e$ is the quiescent emitter current in the transistor associated with the second resistor.

3. A balanced amplifier stage comprising a pair of transistors each having an emitter, a collector, and a base electrode, a potential source, a pair of load impedances connected respectively between one terminal of the potential source and the two collector electrodes, and means including first and second resistors connecting respectively the two emitters to the other terminal of the potential source, said first resistor having a substantially zero temperature coefficient and the second resistor having a relatively large substantially constant temperature coefficient.

4. A differential direct coupled amplifier having a plurality of stages wherein at least one stage comprises a pair of transistors, each transistor having three electrode terminals, each transistor having an impedance load connected in series with the first terminal and a bias resistor connected in series with the second terminal, the two series circuits being connected across a common source of potential, the input signal to said one stage being applied between the third terminals of the two transistors and the output signal from said one stage being derived between the first terminals, one of the bias resistors being a resistance that is substantially constant over a wide temperature range and the other bias resistor having a resistance that varies linearly over the temperature range by an amount equal to the difference between the change in voltage across the first and third terminals of the two transistors divided by the current through one of the series circuits when the input signal is zero.

5. A differential direct coupled amplifier having a plurality of stages wherein at least one stage comprises a pair of transistors, each transistor having three electrode terminals, each transistor having an impedance load connected in series with the first terminal and a bias resistor connected in series with the second terminal, the two series circuits being connected across a common source of potential, the input signal to said one stage being applied between the third terminals of the two transistors and the output signal from said one stage being derived between the first two terminals, one of the bias resistors being a resistance that is substantially constant over a wide temperature range and the other bias resistor having a resistance that varies linearly over the temperature range.

References Cited by the Examiner

UNITED STATES PATENTS

| | | | |
|---|---|---|---|
| 2,924,778 | 2/60 | Barton | 330—15 |
| 2,972,114 | 2/61 | Silberbach | 330—15 |
| 3,013,215 | 12/61 | Buesing et al. | 330—15 |
| 3,046,487 | 7/62 | Matzen et al. | 330—28 X |

OTHER REFERENCES

Beneteau: The Design of High Stability D.C. Amplifiers, Semiconductor Products, February 1961, pages 27–31.

ROY LAKE, *Primary Examiner.*

NATHAN KAUFMAN, *Examiner.*